3,004,920
PROCESS FOR THE PRODUCTION OF
SILICA ORGANOSOLS
John W. Ryznar, La Grange Park, Ill., assignor to Nalco Chemical Company, a corporation of Delaware
No Drawing. Filed Feb. 13, 1958, Ser. No. 714,940
4 Claims. (Cl. 252—309)

The present invention relates to novel silica sols which contain substantial quantities of organic liquids and to the method of preparing such sols.

Colloidal silica suspended in organic liquids is well known. They are usually prepared by hydrolyzing an alkali metal silicate with a mineral acid, adding a water miscible alcohol, azeotropically removing water, separating the precipitated salts and then adding various organic solvents. This process is described in U. S. Patents 2,433,776, 2,433,777, 2,433,778, 2,433,779, and 2,433,780. Another method of preparing organosols is to hydrolyze ethyl silicate with water and acids and to remove the salts with silver oxide or by electrodialysis. Sols of this type are described in Bull. Inst. Phys. Chem. Research (Tokyo), 7, 948–956 (1928). Products of these types are valuable treatment agents for organic solutions or suspensions of plastics.

While the known organosols are useful products, their mode of preparation requires a series of steps which renders their production a costly and time-consuming process. It would be a valuable contribution if a simple method were available for producing colloidal silica suspended in substantial amounts of organic liquids.

It, therefore, becomes an object of the invention to provide a simple process for making colloidal silica sols containing substantial amounts of organic liquids.

Another object is to provide new types of silica sols wherein the colloidal silica is suspended in a novel combination of organic liquids. Other objects will appear hereinafter.

In accordance with the invention it has been found that novel silica sols may be produced by reacting the water of an aqueous colloidal silica sol with a ketal of the formula:

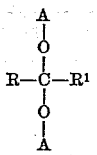

where R, R¹, and A are lower aliphatic groups, with the proviso the sum of the number of carbon atoms in R and R¹ does not exceed 3 and A contains no more than 4 carbon atoms. The reaction is best conducted under acidic conditions and it is therefore desirable to adjust the pH of the starting sol to about 3.5 or less to insure the reaction is going to completion. Of course the pH should not be substantially lower than 1.0 since premature gelation occurs. Excellent results are obtained when the pH of the starting sol is adjusted between 1.5 and 2.5.

The ketals react with water to form a hydrolysis product comprising one mole of ketone and two moles of alcohol. Thus, when ketals are reacted with all the water in an acidified aqueous silica sol the resultant product comprises colloidal silica suspended in a mixture of ketone and alcohol in a molar ratio of 1:2. This reaction may be conducted at room temperature, viz., 72±5° F. and is completed within about five minutes. Due to the nature of the reaction of ketals with water, heat is absorbed, hence the process is endothermic.

The ketals may be added to the aqueous colloidal silica sols to react with all the water present thus rendering the resulting product substantially free of water. Since the ketals do not always react completely there will sometimes be minor amounts of water remaining, but usually this will be less than 2% by weight of the sol and most often substantially less than 1%. To insure the production of an anhydrous product, it is often advisable to use a slight excess of the ketal to insure that water is completely reacted. When all of the water is reacted with a ketal the resultant ketone-alcohol silica sol will be stable for several hours or several days, depending upon such factors as temperature, $SiO_2$ concentration, pH and the type of colloidal silica present in the finished sol. Colloidal silica having large dense particles tend to be less stable than porous finely-aggregated silica clusters.

To produce ketone-alcohol sols having physical and chemical stability for long periods of time it was discovered a certain amount of water should be left unreacted. This water which exerts a stabilizing effect on the finished sol may be said to be chemically combined water or water associated with the colloidal silica. This chemically combined water is always directly proportional to the silica, expressed as $SiO_2$, present in the starting sol in a molar ratio of 5:3. This particular ratio is approximately the molar ratio of monomeric silicic acid which may be expressed as $SiO_2 \cdot 2H_2O$. This ratio is applicable to a large number of types of colloidal silicas having wide variations in particle sizes, densities and concentrations. When the chemically combined water is left unreacted, the amount of free water present is usually less than 1% of the finished sol.

The types of ketals that may be used can be selected from a wide number of compounds. Generally, however, the ketone moiety of the molecule should not contain more than four carbon atoms. This is also true for the alcohol portion of the molecule. Since the reaction of the ketal with water produces a dilution factor on the silica concentration of the starting sol, it is expedient to use ketals having the lowest possible molecular weight. Thus, 2,2-dimethoxypropane is preferred not only from its standpoint of being the simplest, lowest molecular weight ketal, but also from the fact it is commercially available.

The preparation of ketals is conveniently accomplished by reacting a ketone with the orthoformic ester of appropriate alcohols. For a discussion of this preparative technique reference should be made to Journal of the Chemical Society, 1955, pp. 2052–2053. Illustrative ketals that may be used in the practices of the invention are listed in Table 1.

TABLE 1

| No. | Ketal | Starting Ketone | Starting Alcohol |
|---|---|---|---|
| I | 2,2-dimethoxy propane | acetone | methanol. |
| II | 2,2-diethoxy propane | do | ethanol. |
| III | 2,2-di-n-propoxy propane | do | n-propanol. |
| IV | 2,2-di-isobutoxy propane | do | isobutanol. |
| V | 2,2-dimethoxy butane | butanone | methanol. |
| VI | 2,2-diethoxy butane | do | ethanol. |

The starting aqueous colloidal silica sols may be selected from a wide number of materials and they may be prepared by using any of the several well-known methods described in U.S. Patent 2,574,902. A preferred method of making relatively pure silica sols is described in Bird U.S. Patent 2,244,325. This patent shows that alkali metal silicates may be contacted with a cation exchange resin in the hydrogen form to produce silica sols of great purity. The following illustrates several typical starting sols:

*Example I*

Commercial sodium silicate was diluted with Chicago tap water to produce a sodium silicate solution having present therein about 4.5% $SiO_2$. The weight ratio of $Na_2O:SiO_2$ was about 1:3.2, with a specific gravity of about 1.050. This diluted sodium silicate was passed through a column of a hydrogen form sulfonated polystyrene divinylbenzene copolymer cation exchanger of the type disclosed in U.S. Patent 2,366,007. The effluent contained about 3.5% $SiO_2$, and had a pH of 3.5 and a conductivity of about 400 to 800 micromhos.. To this silicic acid sol effluent was added an amount of 26° Baumé ammonium hydroxide sufficient to adjust the pH of the acid sol to about 9.0.

Example II

A portion of the sol of Example I was placed in an evaporating kettle and heated until ammonia and steam vapors began to come off. At this point a small amount of permanent alkali (KOH) was added and fresh ammonia stabilized sol was added to maintain the evaporating volume constant. Throughout the process the pH was never allowed to go below 8.5. This was accomplished by continually adding gaseous ammonia during the heating process. The constant evaporation was continued with constant checks being maintained to keep the pH always above 8.5, and was continued until specific gravity of the sol had reached 1.20 at 68° F. When this specific gravity had been obtained an amount of potassium hydroxide was added to give the finished sol a pH of 9.0. This sol had an $SiO_2$ concentration of 30%.

Example III

Another sol was produced by using the method shown in Example II. In this instance, however, the concentration process was continued until the sol had an $SiO_2$ concentration of about 52%.

Example IV

Using the method of Example II, a sol was concentrated to 35% $SiO_2$.

Example V

A silica sol having an average particle size of 5 to 8 millimicrons in diameter was prepared in accordance with the teachings of Alexander U.S. Patent 2,750,345. The $SiO_2$ concentration was 15%.

The sols of Examples II, III, and IV contained discrete particles of silica ranging in particle size from 10–150 millimicrons in diameter. As previously indicated, the larger particle size sols form less stable products than smaller particle size sols; hence the technique of leaving the chemically-combined water present in the larger particle size sols is preferable when prolonged stability is desired. The particle size of any starting silica sols should not be greater than 150 millimicrons.

It is quite apparent the process is most practicable when starting sols having the largest possible $SiO_2$ concentration are used. The dilution caused by the reaction means the finished sol will have a silica concentration less than that of the starting sol. Thus, when the starting sol has a silica concentration ranging from 17.5% to 52% by weight of silica, and the process of the invention is used to react with the free water, the resultant sol has a silica concentration of from 5% to 15%. Specifications of finished sols of this type are presented below:

| Ingredients: | Percent by weight |
| --- | --- |
| Silica, as $SiO_2$ | 5–15 |
| Chemically-combined water | 3.09–9.05 |
| Free water | .25–.75 |
| Water-miscible ketone and water-miscible alcohol at molar ratio 1:2 | 91.66–75.2 |

Where it is desired to produce a substantially anhydrous sol more ketal may be added to products of the type shown above, or it may be added directly to an aqueous colloidal silica sol. There will sometimes be some water left in the finished sol, but this will never exceed 2% by weight. This water includes the hydrated water which forms on the surface of the silica particles. This type of water is difficultly removed and does not interfere with the organic nature of the product. This water of hydration is based on the nature of the silica particles and may be calculated by known methods: see The Colloidal Chemistry of Silica and Silicates, by R. K. Iler, Cornell University Press (1955), p. 98 et subs.

To further illustrate the invention, the following examples are given:

Example VI

The following ingredients represented a charge to a beaker fitted with a stirrer:

| Ingredients: | Percent by weight |
| --- | --- |
| The sol of Example IV | 20.8 |
| 2,2-dimethoxy propane | 78.2 |
| Phosphoric acid | 1.0 |

The 2,2-dimethoxy propane and the silica were mixed with stirring and the acid was then added which adjusted the pH to 1.3. The reaction mass became quite cloudy, but at the end of five minutes the product became opalescent, which indicated the reaction was substantially complete. This product had the following composition:

| Ingredients: | Percent by weight |
| --- | --- |
| Silica, as $SiO_2$ | 7.3 |
| Methanol | 48.1 |
| Acetone | 43.6 |
| $H_3PO_4$ | 1.0 |

A test of this product with Carl Fischer reagent showed no free water water to be present. The product was stable at room temperature for several weeks.

Example VII

Using the test procedure of Example VI, the following constituted a charge to the reaction vessel:

| Ingredients: | Percent by weight |
| --- | --- |
| The silica sol of Example IV | 35.4 |
| 2,2-dimethoxy propane | 64.3 |
| Phosphoric acid | .3 |

The resultant product had the following composition:

| Ingredients: | Percent by weight |
| --- | --- |
| Silica, as $SiO_2$ | 10.6 |
| Chemically-combined water | 6.4 |
| Free water | 7.3 |
| Methanol | 39.6 |
| Acetone | 35.8 |
| Phosphoric acid | .3 |

This product was stable at room temperature for several months.

Example VIII

Using the procedures of Examples VI and VII, several organosols were prepared from the silica sols of Examples II, III, IV, and V using ketals II, III, IV, V, or VI of Table 1, with good results being obtained in each instance.

The products of the invention are useful as agents for increasing the coefficient of friction between contacting metal surfaces, particularly those products which contain highly volatile alcohols and ketones. They are also useful when it is desirable to incorporate colloidal silica into plastics using organic solvents.

The invention is hereby described as follows:

1. The process of producing a colloidal silica sol consisting essentially of discrete particles of hydrated, colloidal silica suspended in a liquid medium which is composed primarily of a water-miscible ketone and a water-miscible alcohol combined in a molar ratio of 1:2, which comprises adjusting the pH of an aqueous colloidal silica sol to from 1.0 to 3.5, and then reacting substantially all the free water of said sol with a ketal of the formula:

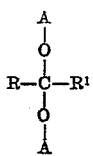

where R and R¹ are lower aliphatic groups, the sum of which is no greater than three carbon atoms in chain length and A is a lower aliphaatic group containing no more than 4 carbon atoms.

2. The process of claim 1 where the ketal is 2,2-dimethoxypropane.

3. The process of producing a colloidal silica sol containing from 5% to 15% by weight of silica, as $SiO_2$, and consisting essentially of discrete particles of hydrated, colloidal silica suspended in a liquid medium which is composed primarily of a water-miscible ketone and a water-miscible alcohol combined in a molar ratio of 1:2, which comprises adjusting the pH of an aqueous colloidal silica sol having an $SiO_2$ content from between 17% and 52%, to from 1.0 to 3.5, and then reacting substantially all the free water of said sol with a ketal of the formula:

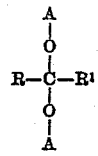

where R and R¹ are lower aliphatic groups, the sum of which is no greater than three carbon atoms in chain length and A is a lower aliphatic group containing no more than 4 carbon atoms.

4. The process of claim 3 where the ketal is 2,2-dimethoxy propane.

References Cited in the file of this patent
UNITED STATES PATENTS

| | | |
|---|---|---|
| 2,383,653 | Kirk | Aug. 28, 1945 |
| 2,386,247 | Marshall | Oct. 9, 1945 |